Oct. 4, 1932.   A. W. WOODWARD   1,880,641

VEHICLE WHEEL

Filed March 20, 1929   3 Sheets-Sheet 1

Inventor
Alva W. Woodward

Attorney

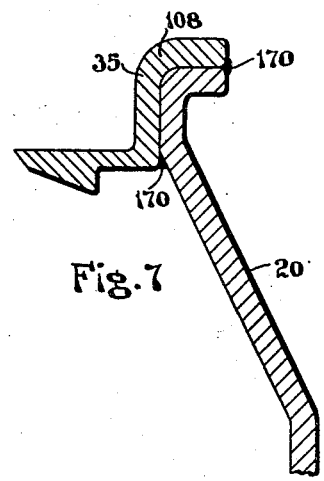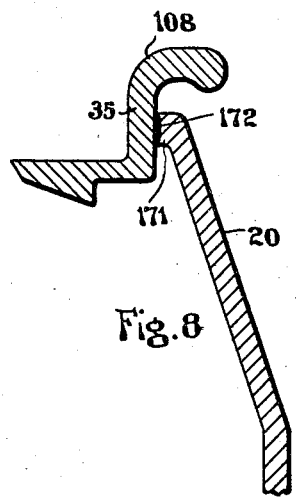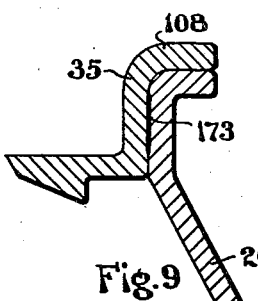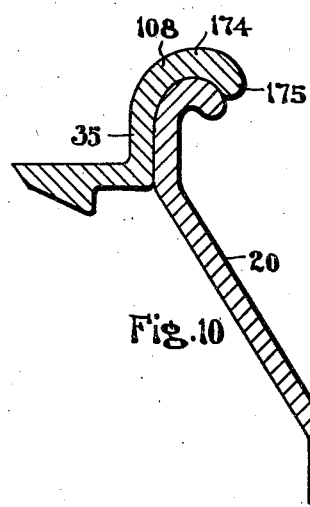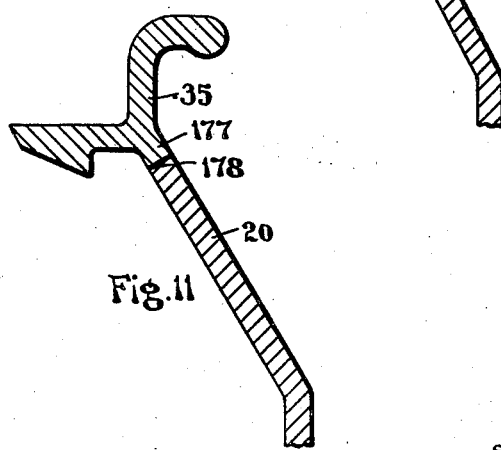

Oct. 4, 1932.  A. W. WOODWARD  1,880,641
VEHICLE WHEEL
Filed March 20, 1929   3 Sheets-Sheet 3

Inventor
Alva W. Woodward

Attorney

Patented Oct. 4, 1932

1,880,641

UNITED STATES PATENT OFFICE

ALVA W. WOODWARD, OF AKRON, OHIO, ASSIGNOR TO THE GOODYEAR TIRE & RUBBER COMPANY, OF AKRON, OHIO, A CORPORATION OF OHIO

VEHICLE WHEEL

Application filed March 20, 1929. Serial No. 348,478.

This invention relates to vehicle wheels having a hub and tire rim supporting wheel members such as discs or members having spokes secured thereto, and it has particular relation to the means employed for supporting the wheel members on the hub and for operatively mounting rims on the wheel members.

One object of the invention is to provide a wheel composed of a hub and one or more wheel members removably secured thereto, and means, in addition to the securing means for supporting the wheel members on the hub in such manner that the radial loads imposed upon the latter are transmitted directly to the hub.

Another object of the invention is to provide in a rim composed of a transversely split base portion and an endless side ring, a latching device for preventing relative movement of the transversely split base portion and the side ring.

Another object of the invention is to provide a novel wheel assembly in which wheel members are removably secured to a hub and the outer peripheral parts of the wheel members are permanently secured to tire supporting rims.

As heretofore practiced, an ordinary means for securing wheel members, provided with central hub receiving openings, such as discs and those having spokes, to the hubs of vehicle wheels, comprised bolts projecting through openings in radial flanges on the hubs and through corresponding openings in the wheel members. The outer ends of the bolts were provided with nuts engaging respectively the flange on the hub and the outer wheel member for retaining the parts in assembled relation. The bolt receiving openings in the wheel members necessarily were of slightly greater diameter than that of the bolts projecting therethrough in order to facilitate the mounting of the members on the bolts. Owing to this fact, loads imposed upon the wheel members tended to move the discs relative to the bolts and the varying loads imposed upon the wheel members caused relative radial movement or slippage thereof. These movements of the wheel members both respectively and relative to the hub were very undesirable.

In previously known constructions, it has been impractical to secure permanently the outer peripheral parts of a wheel member such as that designated above, to a rim composed of a transversely split base portion interlocked with endless side rings. This was owing to the fact that the base portion of the rim, to which the wheel member ordinarily was secured, necessarily was contractible in order that the rim could be disassembled.

According to this invention, the central opening in each wheel member is conical and the members are oppositely disposed on the hub of the wheel. The central openings in the wheel members receive a cylindrical portion of the hub of the vehicle wheel and a split ring of V-shape cross-section is disposed between the sides of the conical surfaces defining the openings with its base resting upon the cylindrical portion of the hub. The inclined sides of the ring are slightly smaller in diameter than the aforesaid conical sides of the openings and extend circumferentially in slightly serpentine formation. Hence, one inclined outer surface thereof engages the conical side of the opening in one wheel member at circumferentially spaced points whereas the other inclined surface of the ring engages the side of the conical opening in the other wheel member at circumferentially spaced points alternating with respect to the points at which the other inclined surface of the ring engages the first mentioned wheel member. By providing a construction of this character, each wheel member positively engages the ring which in turn is supported directly upon the hub.

Also, the invention contemplates the provision of a pilot nut for temporarily securing the lower portion of the inner wheel member on the hub pending mounting of the outer wheel member on the latter. This nut is so related with the outer wheel member that it does not interfere with the latter and hence can be retained as a driving connection between the inner wheel member and the bolt upon which the nut is mounted.

Besides the foregoing, the invention provides a latch for preventing relative circumferential movement of the endless side ring and the transversely split base portion of the rim and normally for preventing contraction of the transversely split base portion. In such a rim, the split in the base portion communicates with the valve stem opening therein and the valve stem projects laterally beneath the endless side ring. The latch is disposed in the valve stem opening in the base portion of the rim and is pivoted to the endless side ring by a pivot pin rotatably projecting through the latter. That portion of the latch disposed in the valve stem opening substantially engages the radial end surfaces of the transversely split base portion thereby serving as a driving connection between the endless side ring and the base portion.

For a better understanding of the invention, reference may now be had to the accompanying drawings, forming a part of the specification, in which.

Figures 2, 5, 6:
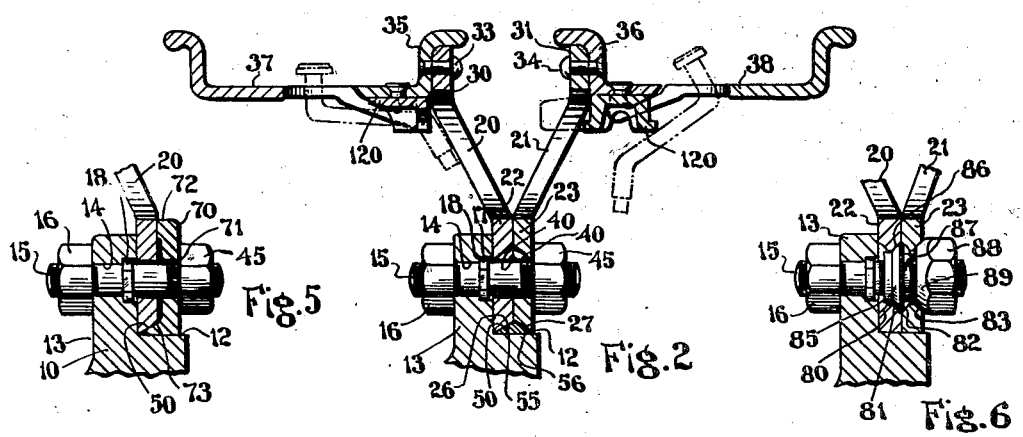
Fig. 2 is a cross-sectional view taken substantially along the line II—II of Fig. 1.
Fig. 5 is a fragmentary cross-sectional view showing a means for securing one of a pair of wheel members on the hub of a wheel.
Fig. 6 is a fragmentary cross-sectional view illustrating a means for securing to the hub of a wheel a pair of wheel members having their bolt receiving openings counterbored on both sides.
Figure 3:
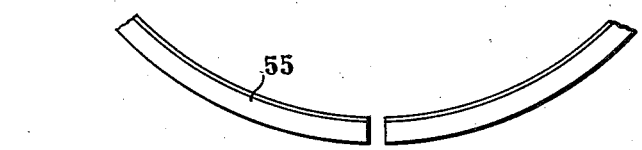
Fig. 3 is a fragmentary elevational view of a ring employed in the construction shown by Figs. 1 and 2.
Figure 12:
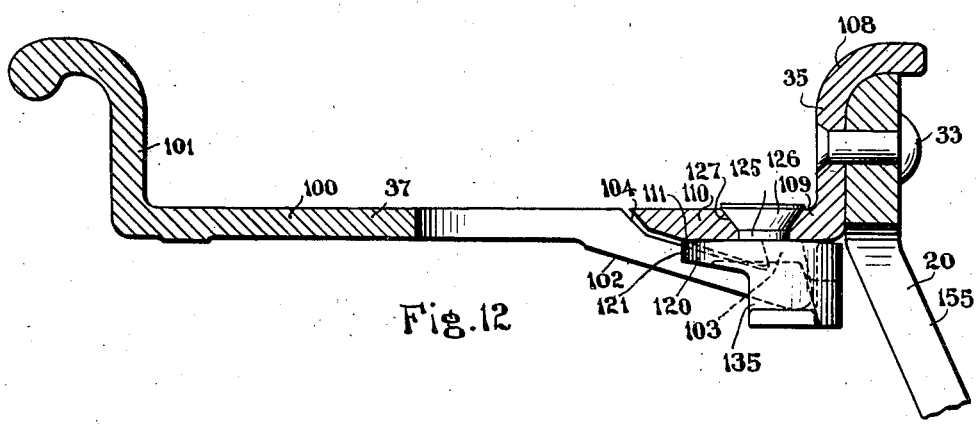
Figure 13:
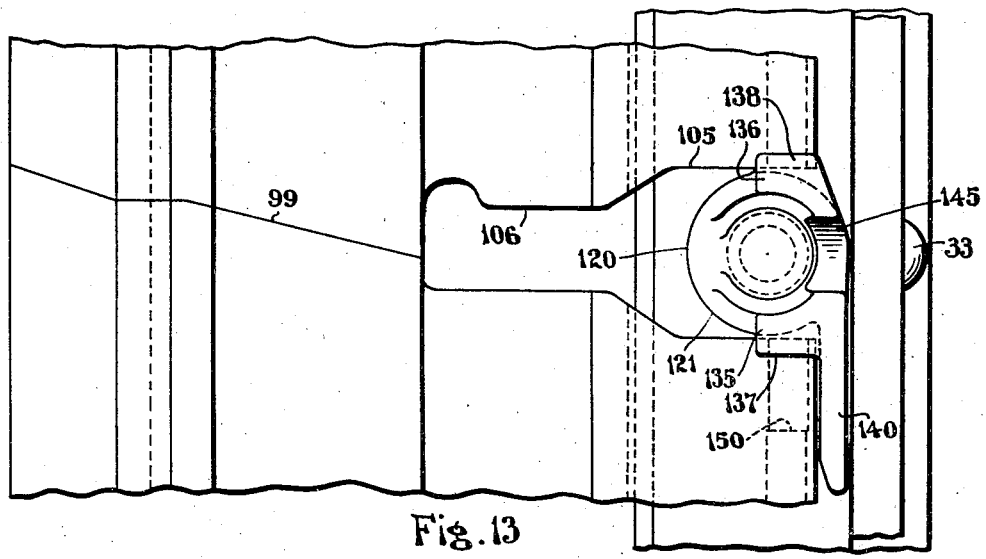

Figs. 7, 8, 9, 10, and 11 are similar views showing in detail several forms of construction for securing the endless side ring of a rim to the outer parts of a wheel member;

Fig. 12 is a fragmentary view on a larger scale of the construction shown by Fig. 2, illustrating the mounting of the inner rim on the inner wheel member, the valve stem shown by Fig. 2 being omitted for the sake of clearness;

Fig. 13 is a fragmentary view taken from the under side of Fig. 12; and

Figure 14:
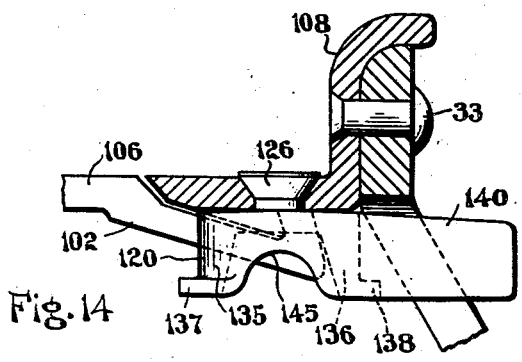

Fig. 14 is a fragmentary view of Fig. 12 on a larger scale illustrating the latch in its inoperative position.

Figure 1:
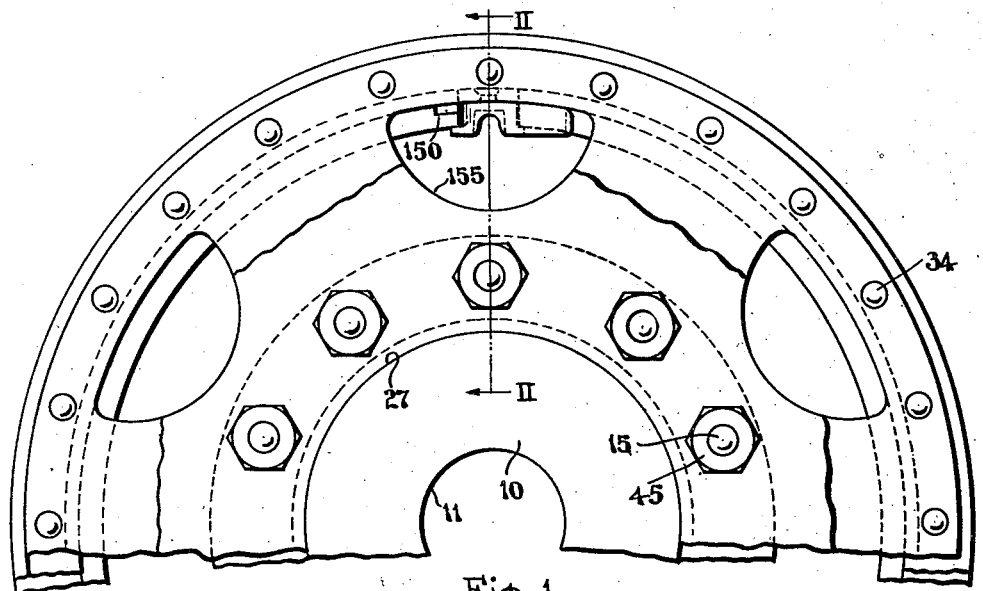
Fig. 1 is a fragmentary elevational view of a wheel embodying the principles of my invention.

Referring to Figs. 1 and 2, a wheel hub 10 of ordinary construction is provided with a central axle receiving opening 11, an outer cylindrical wall 12 and a radially disposed flange 13 at one end of the latter. The flange 13 is provided with a series of circumferentially spaced openings 14, each of which receives a bolt 15, having a securing nut 16 on one end thereof. A shoulder 17 integral with an intermediate portion of each bolt is disposed in a recess 18 forming a portion of the openings 14 at the side of the flange opposite the nut 16. The opposite end of each bolt 15 receives a pair of outwardly diverging wheel members 20 and 21 having central openings 26 and 27 respectively of conical contour for receiving the cylindrical portion 12 of the hub. Adjacent the openings in the wheel members, the latter have radially disposed portions 22 and 23, respectively. These wheel members may be in the form of solid discs or they may be perforated to form spokes. The outer edge portions of the wheel members also are directed radially as indicated at 30 and 31 and are secured by rivets 33 and 34 to the endless side rings 35 and 36 of a pair of rims 37 and 38. Openings 40 and 41 provided in the radially disposed portions 22 and 23 of the wheel members receive the bolts 15 and nuts 45, threaded on the outer ends of the bolts, retain the wheel members on the latter.

Figure 4:
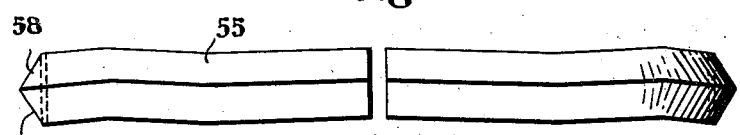
Fig. 4 is a view showing the entire ring as seen from the bottom side of Fig. 3.

It will be observed that the conical faces defining the central openings 26 and 27 converge and meet in such manner as to provide an annular groove 50 of V-shape in cross-section. A split locking ring 55 of V-shape in cross-section and slightly smaller than the recess 50 is disposed in the latter recess. This ring, as particularly shown by Fig. 4, is of slightly serpentine form. Its base 56 rests directly on the cylindrical portion 12 of the hub while its inclined outer surfaces 57 and 58, owing to the serpentine form of the ring, engage the surfaces of the groove 50 at circumferentially spaced points. It is apparent that the surfaces 57 and 58 of the ring alternately engage the conical surfaces defining the openings 26 and 27, respectively. Hence, each wheel member is directly supported by the cylindrical portion of the hub through the instrumentality of the ring 55. This ring also serves as a spring between the wheel members, thereby urging them away from each other and providing constant pressure against the nuts 45 on the bolts 15, even though the nuts become slightly loosened.

Figure 5 discloses a means for securing a single wheel member 20 on the bolts 15. This means comprises a plurality of clamps 70, each of which is provided with an opening 71 for receiving the bolt 15. The radial outer ends of the clamps have portions 72 directed toward and abutting the wheel member 20 whereas the inner ends have wedges 73 projecting between the conical surface defining the opening 26 and the cylindrical portion 12 of the hub. By tightening the nuts 45 on the bolts 15, the clamping members 70 are moved against the wheel member and the wedges 73 are secured partially within the conical openings 26. Thus the wheel member is rigidly secured in position. If desired, a clamping ring, either endless or split at one point, may be employed in place of the clamps 70.

Figure 6 relates to a construction in which the radial portions 22 and 23 of the wheel members 20 and 21 have their bolt receiving openings counterbored on both sides, as indicated respectively at 80—81 and 82—83. In order to secure the inner wheel member 20 on the bolts 15 at least temporarily until the outer wheel member 21 is mounted on the bolts, a pilot nut 85 having a conical surface 86 and a hexagonal head 87 is threaded on one of the lower bolts 15 until the conical surface 86 engages the side of the corresponding counterbored opening 81 in the wheel member 20. Then the outer wheel member 21 is disposed on the bolts, and nuts 88, having conical surfaces 89, are threaded on the latter until the conical surfaces 89 thereof engage the counterbored surfaces 83 of the bolt receiving openings in the wheel member 21. Continued tightening of the nuts 88 results in a rigid mounting of the wheel members on the bolts. The axial length of the pilot nut is such that it does not interfere with the mounting of the outer conical nut mounted on the same bolt. In addition to serving as a means for temporarily securing the inner wheel member in position, the pilot nut provides a driving connection between the inner wheel member 20 and the bolts 15 and also for preventing relative radial movement of the latter and the wheel member.

As best shown by Figs. 12 and 13, the rim 37 comprises a base portion 100, transversely split, as indicated at 99 and having a tire retaining flange 101 at one side. An inwardly inclined portion 102 at its other side terminates in an outwardly projecting radial flange 103, thereby providing a gutter 104 in the outer peripheral surface of the base member at the side thereof opposite the flange 101. The split 99 in the base member communicates with a valve stem opening 106 extending from a point centrally of the base portion through the inclined portion 102 and the radial flange 103. The valve stem opening 106 is enlarged, as indicated at 105, substantially co-extensively with the inclined portion 102 and the radial flange 103.

The endless side ring 35 of the rim is provided with a tire retaining flange 108, which merges at its inner end with a cylindrical portion 109 parallel to the base member 100. The cylindrical base portion 109 is integral with a part 110 complementary to and normally disposed in the gutter 104 in the transversely split base portion 100 of the rim. The lower portion of the part 110 is provided with a laterally extending slot 111 diametrically co-extensive with the radial flange 103 of the base member 100 and coinciding with the enlarged portion 105 of the valve stem opening 106.

Figure 7 discloses another construction for securing the wheel member 20 to the tire retaining flange 108 of the side ring 35. Instead of employing rivets as before described, the outer peripheral part of the wheel member and the tire retaining flange 108 are seam welded, as indicated at 170.

According to Fig. 8, the outer peripheral part of the wheel member 20 is provided with a laterally projecting portion 171 which is welded directly to the radial wall of the tire retaining flange 108, as indicated at 172.

In Fig. 9, a means of connection is shown in which the radial wall of the tire retaining flange 108 is spot welded to the outer peripheral part of the wheel member 20, as indicated at 173.

According to Fig. 10, the outer peripheral part of the wheel member 20 is rolled or expanded radially into abutting relation with the endless side ring 35. As clearly shown by the figure, the endless side ring has an outwardly flared portion 174 terminating in an inwardly curved portion 175. Owing to the fact that the outer peripheral part of the wheel member is curved similarly to the outer surface of the tire retaining flange, the parts are locked together against both lateral and radial relative movement.

According to Fig. 11, the endless ring 35 is provided with an oblique rib 177 which is welded directly to the outer peripheral edge of the wheel member 20, as indicated at 178.

Referring to Figs. 12 to 14, a latching member 120 is disposed in the laterally extending openings 105 and 111 in the transversely split base portion 100 and the endless side ring 108 respectively. This latching member has a circular base portion 121 of substantially the same diameter as the distance across the opening 105 and is pivoted to the endless side ring 108 by a pin 125 rotatably projecting through the cylindrical portion 109 of the latter. The outer end of the pin 125 is provided with a conical head 126 which coacts with a counterbored opening 127 in the outer surface of the cylindrical portion 109. The head 126 so projects radially outwardly slightly beyond the outer peripheral surface of the cylindrical portion 109 that when a tire on the rim is inflated, pressure of the tire tends to prevent turning of the head 126 and consequently the latching member 120. The latching member is also provided with diametrically opposed radially inwardly projecting lugs 135 and 136 terminating respectively in oppositely projecting portions 137 and 138 which are adapted to underlie the ends of the transversely split base member 37 on opposite sides of the opening 105 and thus prevent radially inward movement of such ends relative to the endless side ring.

Also the latching member 120 is provided with an operating handle 140 for facilitating turning of the latching member into its inoperative position in which position the portions 137 and 138 are disposed within the opening 105 and free from engagement with the ends of the transversely split base portion. Opposite edges of the circular portion 121 of the latching member substantially engage the ends of the transversely split base portion defined by the opening 105 and prevent relative circumferential movement of the transversely split base portion and the endless side ring. The central portion of the latching member is provided with a semicircular recess 145 which extends at right angles to the oppositely projecting portions 137 and 138. By reason of this recess, a valve stem in the openings 105 and 106 may rest in the recess 145 when the latch is in its operative position. In order to release the latch, it is necessary to displace the valve stem radially inwardly until it is free of the recess 145.

In case a tire, mounted on one of the rims 37 or 38, becomes deflated owing, for example, to a puncture, the wheel member associated with that rim is removed from the hub 10 of the vehicle wheel by removing the nuts 45 and demounting the wheel member from the bolts 15. Thereafter, the valve stem is displaced from the recess 145 of the latch and the latch turned to its inoperative position, as shown by Fig. 14. By means of a suitable tool, not shown, adapted to engage in a notch 150 in the radial flange 103 of the transversely split base portion 100 of the rim adjacent the enlarged portion 105 of the valve stem opening 106, one end of the transversely split base portion may be displaced radially inwardly from engagement with the endless side ring and thereafter suitable purchase made with the tool between the endless side ring and the radial flange 103 until the transversely split base portion is entirely free from the endless side ring. Openings, as indicated at 155, in the wheel members 20 and 25, one of which openings is disposed adjacent the latching member 120, facilitate the initial purchase of the tool as well as the successive purchases thereof. The rim is assembled in a manner the reverse of that described for disassembling it.

From the foregoing description, it is apparent that a wheel has been provided in which one or more wheel members are directly supported upon a hub instead of being supported alone by bolts removably securing the wheel member to the hub. This is highly desirable where a pair of wheel members are employed because it not only prevents radial slippage between the wheel members but also relieves the strain on the bolts. In addition, the serpentine ring provided between the wheel members and the hub serves as a spring tending to prevent accidental loosening of the nuts 45 from the outer ends of the bolts owing to the fact that the ring tends to separate the wheel members laterally.

Also, it is apparent that means have been provided for retaining the inner of a pair of wheel members in position at least temporarily until the outer wheel member is positioned on the bolts, and that this means serves as a driving connection between the inner wheel member and the bolts.

Moreover, it is apparent that novel and efficient means have been provided for securing the outer peripheral parts of wheel members to rims and especially to rims composed of transversely split base portions and endless side rings. The latching device provided for retaining the transversely split base portion and endless side ring in securely locked relation is particularly adapted for employment in wheel assemblies of the character described in which the outer peripheral parts of the wheel members are secured to the endless side rings.

Although I have illustrated the preferred forms which the invention may assume and have described those forms in detail, it will be apparent to those skilled in the art that the invention is not so limited but that various modifications may be made therein without departing from the spirit of the invention or from the scope of the appended claims.

What I claim is:

1. The combination of a wheel having an outer rim supporting portion, a rim comprising a transversely split base member and an endless side ring interlocked with the base, the rim supporting portion of the wheel being rigidly secured to the endless side ring of the rim.

2. A vehicle wheel comprising a wheel member adapted to be supported by an axle of the vehicle, a rim comprising a transversely split base member and an endless side ring interlocked against lateral movement relative thereto, the endless side ring being secured to the outer parts of the wheel member and means positioned between the endless side ring and transversely split base portion for preventing relative circumferential movement thereof.

3. A vehicle wheel comprising a wheel member adapted to be supported by an axle of the vehicle, a rim comprising a transversely split base member and an endless side ring interlocked against relative lateral movement therewith, the endless side ring being secured to the outer parts of the wheel member, and a latch between the endless side ring and transversely split base portion for preventing relative circumferential and radial movement thereof.

4. The combination with a rim composed of a transversely split base portion having an annular gutter at one side and an endless ring disposed in the gutter, of a metallic wheel member rigidly connected to the endless ring.

5. The combination with a rim composed of a transversely split base portion having an annular gutter at one side and an endless ring disposed in the gutter, of a metallic wheel member rigidly connected to the endless ring, said connection constituting the sole supporting means between the rim and the wheel member.

6. The combination with a wheel member adapted to be supported upon the axle of a vehicle, a rim comprising a transversely split base portion and an endless side ring, said split portion having a tire engaging flange at one side and an inclined portion at its other side, the latter portion terminating in a substantially outwardly projecting flange thereby defining a gutter, said endless side ring having a tire-engaging flange and a portion disposed in the gutter of the split part of the rim, the split in the base portion being so formed that in conjunction with the endless side ring the ends of the split base portion are prevented from radial and axial movement, relatively, said wheel member being rigidly secured to the endless side ring of the rim.

In witness whereof, I have hereunto signed my name.

Signed at Akron, in the county of Summit and State of Ohio, U. S. A., this 19th day of March, 1929.

ALVA W. WOODWARD.